United States Patent [19]

Vinatier

[11] Patent Number: 4,692,295

[45] Date of Patent: Sep. 8, 1987

[54] THERMOPLASTIC RESIN COMPOSITION FOR BIAXIAL ORIENTATION

[75] Inventor: Bernard Vinatier, Coye la Foret, France

[73] Assignee: Produits Chimiques Ugine Kuhlmann, France

[21] Appl. No.: 774,375

[22] Filed: Sep. 9, 1985

Related U.S. Application Data

[63] Continuation of Ser. No. 605,577, Apr. 30, 1984, abandoned, which is a continuation of Ser. No. 446,457, Dec. 3, 1982, abandoned.

[30] Foreign Application Priority Data

Dec. 11, 1981 [FR] France .................................. 81 23149

[51] Int. Cl.$^4$ ...................... C08L 25/06; C08L 25/08; C08L 25/12; C08L 27/06
[52] U.S. Cl. ................................. 264/291; 264/290.2; 264/331.16; 264/331.17; 264/331.15; 525/84; 525/86; 525/238; 525/239; 525/241; 525/198; 526/348.1; 526/347.2
[58] Field of Search ............... 525/241, 238, 239, 198; 264/290.2, 291; 526/347.2, 348.1

[56] References Cited

U.S. PATENT DOCUMENTS

| | | | |
|---|---|---|---|
| 2,646,417 | 7/1953 | Jennings | 525/239 |
| 2,791,600 | 5/1957 | Schwaegerle | 525/239 |
| 2,997,743 | 8/1961 | Isaksen et al. | 526/347.2 |
| 3,085,082 | 4/1963 | Baer et al. | 525/239 |
| 3,234,313 | 2/1966 | Miller et al. | 525/239 |
| 4,086,296 | 4/1978 | Carty et al. | 260/857 |
| 4,426,346 | 1/1984 | Ong et al. | 526/347.2 |

FOREIGN PATENT DOCUMENTS

| | | |
|---|---|---|
| 859217 | 12/1970 | Canada. |
| 921308 | 3/1963 | United Kingdom ............... 528/502 |
| 1292864 | 10/1972 | United Kingdom. |

OTHER PUBLICATIONS

Schildknecht—"Vinyl & Related Polymers"—pp. 45–47 (2/52).
"Polyvinylchloride" Sarnetnick—Apr. 1969, p. 215.

*Primary Examiner*—Carman J. Seccuro
*Attorney, Agent, or Firm*—Sigalos & Levine

[57] ABSTRACT

Thermoplastic resin compositions comprising a thermoplastic resin capable of biaxial orientation and an additive resin, having a molecular weight above $10^6$, compatible with said thermoplastic resin and selected from a homopolymer of a vinyl monomer or a copolymer of at least two vinyl monomers.

2 Claims, 8 Drawing Figures

THERMOPLASTIC RESIN COMPOSITION FOR BIAXIAL ORIENTATION

This is a continuation of application Ser. No. 605,577, filed Apr. 30, 1984, now abandoned, which is a continuation of application Ser. No. 446,457, filed Dec. 3, 1982, now abandoned.

BACKGROUND OF THE INVENTION

It is known how to manufacture from thermoplastic resins, such as polyvinyl chloride (PVC) and acrylonitrile-butadiene-styrene copolymers (ABS), finished articles presenting improved mechanical characteristics by orienting the macromolecules. Such is now being practiced in the domain of synthetic fibers. Industrial applications of this principle are starting to be developed in order to obtain plates, films, tubes or bottles, particularly in PVC. Orientation can take place in one direction or in two orthogonal directions, and in proportion to the orientation achieved, we can observe an important increase in the rigidity and in the impact strength (resistance to shock), whereas the gas permeability diminishes. This orientation operation carried out in continuous or in discontinuous manner comes to be added to the customary stages of the shaping (molding) operation of the thermoplastic polymers. The practical conditions for obtaining a substantial orientation of the macromolecules, for instance the temperature at which the operation must take place, are not customary and pose problems with regard to the production of the material.

In order to orient the macromolecules to the maximum and to preserve a sufficient level of orientation in the finished material, a high speed traction must be exerted on the material, and this while the polymer is in its visco-elastic phase, that is to say at an unusually low temperature, near the glass transition temperature; i.e., for example, for PVC in the 85°–110° C. interval. Then the stretched material must be cooled rapidly, as soon as the end of drawing, in order to avoid the relaxation phenomenon, if one desires to preserve the maximum benefit of the achieved orientation. It has been observed that the closer the temperature of the material is, at the moment it is being stretched, to the glass transition temperature, the more effective is the final orientation or residual orientation or orientation which subsists in the material and the better is the rigidity of the final product after cooling.

On the other hand, the closer the vitreous transition temperature is being approached, the higher is the stress to be applied onto the material in order to stretch it to orient it. Consequently, the means required for the orientation of a flat plate, for instance, which comprises fastening devices attached to the plate on its edges and one or two traction mechanisms, will be all the more voluminous and costly when it is desired to stretched the material at low temperature. In the same manner, if one desires to orient a tube in both directions, the longitudinal traction and the internal pressure to be exerted will be all the greater, thus more costly, with lower temperatures being approached.

A priori it would thus be advantageous to stretch the material at a temperature clearly higher than the glass transition temperature, for instance in the 130°–150° C. zone, since the necessary stress would be lower. Unfortunately, at these higher temperatures, the elongation capacity of the material is such smaller and the relaxation velocity of the polymer chains is higher, so that only elongations insufficient to provide an orientation which appreciably improves the final mechanical characteristics can be obtained. Under these conditions, only an elongation of the order of 100% can be obtained for the PVC, for instance, and such an elongation of the order of 100% is not sufficient for bringing on a residual or final orientation.

These consideration on the behavior on stretching of a thermoplastic resin in its elastic phase, as a function of the temperature, are illustrated by FIG. 1, a graph, which at (a) gives the elongation at break, at (b) the stress at break and at (c) the stress at 200% of elongation as a function of the temperature, for non-plasticized PVC stretched at a speed of 666% per minute. FIG. 2 is a graph showing the stress at break in traction at 23° C. and at a speed of 5 mm/minute of non-plasticized PVC specimens previously oriented by 200% elongation at a speed of 666%/min; then rapidly cooled down, as a function of the temperature at orientation. By considering these two graphs simultaneously, it can be seen that if one wishes to stretch by 200%, a better final rigidity is obtained by doing it at 100% C. rather than at 120° C., but then the stress force to be exerted amounts to 3.5 MPa instead of 2.5 MPa.

SUMMARY OF THE INVENTION

The present invention provides thermoplastic resin compositions which make it possible to obtain biaxially oriented materials with improved mechanical properties; which compositions require lower tensile force to stretch them during orientation.

Briefly, the present invention relates to thermoplastic resin compositions comprising a thermoplastic resin capable of biaxial orientation and an additive resin, having a molecular weight above $10_6$, compatible with said thermoplastic resin; there being about 0.2 to 5 parts by weight of said additive resin for each 100 parts by weight of said thermoplastic resin.

DETAILED DESCRIPTION

Figure 1:
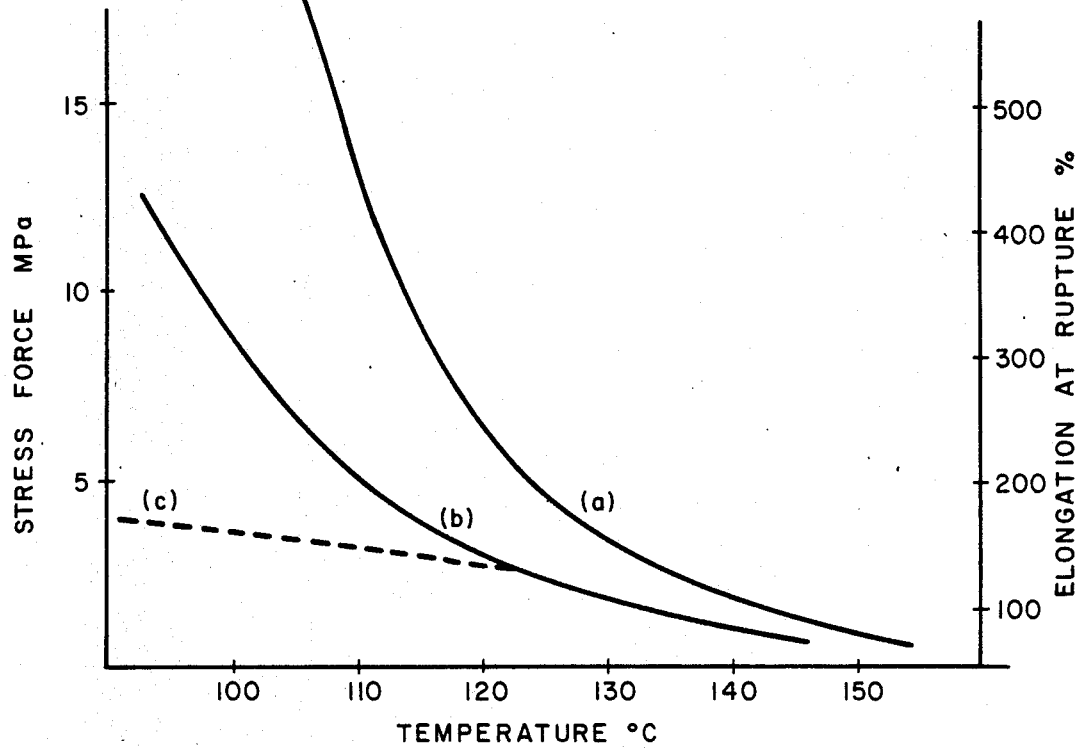
Figure 2:
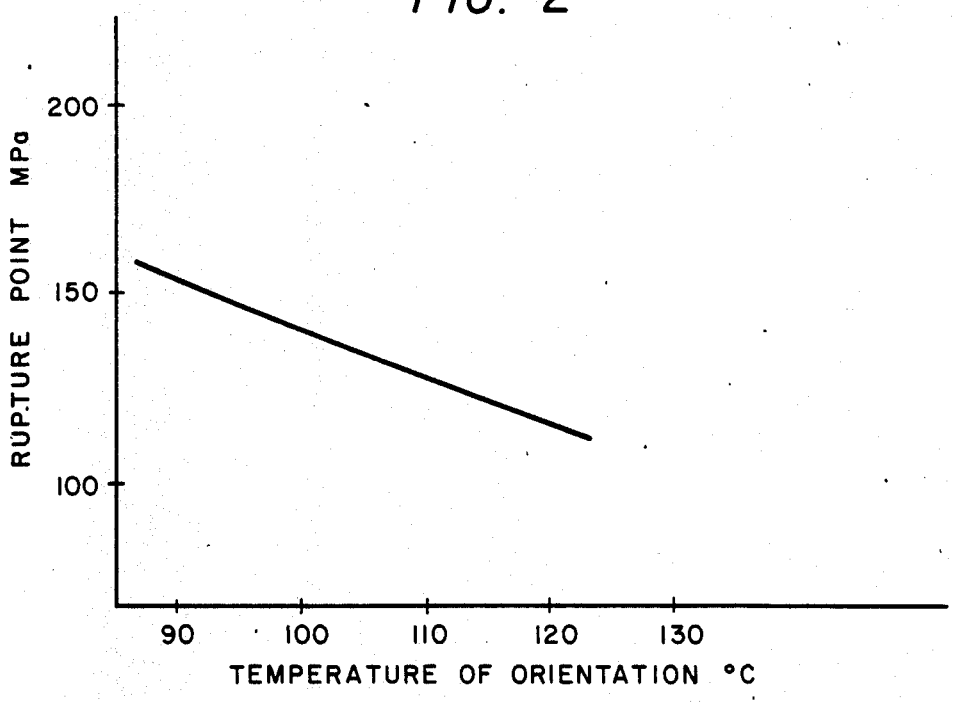

As to the thermoplastic resin capable of biaxial orientation, suitable are vinyl chloride homopolymers and copolymers, styrenic homopolymers and copolymers, and mixtures of the foregoing with one or more elastomers. Specific examples are:

(A) The homopolymers of vinyl chloride, as is or having undergone, after polymerization, a chemical reaction; for instance, a super-chlorination, as well as the copolymers of vinyl chloride with one or several other copolymerizable monomers such as: vinyl acetate, vinylidene chloride, vinyl and vinylidene fluorides, vinyl esters of aliphatic acids, alkylvinyl ethers, unsaturated acids (such as acrylic acid, methacrylic acid, crotonic acid, maleic acid, fumaric acid, undecanoic acid, metallic salts or alkylic esters of such acids, acrylonitrile, or methacrylonitrile, olefins such as ethylene, propylene or isobutylene, acrylamide and maleimides which are either substituted or not substituted, and aromatic vinyl monomers.

(B) The styrene polymers comprising, in particular, styrene homopolymers, copolymers of styrene and/or derivatives of styrene substituted on the ring or in the alpha position, such as chloro or dichlorostyrene, vinyltoluene, alpha-methylstyrene, with one or several copolymerizable monomers, such as acrylonitrile, methacrylonitrile, acrylic and methacrylic acids and their alkyl esters, in particular methyl ethyl and butyl esters.

(C) The mixtures of one or several of the products of type A and B above with one or several elastomers intended to improve the impact resistance, for instance acrylonitrile-styrene copolymer reinforced by a crosslinked acrylonitrile-butadiene elastomer prepared in aqueous emulsion, or by a grafting product of acrylonitrile and of styrene on a elastomer of polybutadiene, PVC or copolymer of vinyl chloride reinforced by an acrylonitrile-butadiene elastomer, a chlorinated polyethylene, a grafting product of vinyl chloride or of acrylonitrile and of styrene on a polybutadiene, or a saturated acrylic elastomer or of polyolefins, or yet of the vinyl ethylene-acetate type.

The additive resin is a polymer obtained by the polymerization of one or several copolymerizable vinyl monomers.

Nonlimiting examples of such additive polymers are the polymers obtained from vinylaromatic hydrocarbons like styrene or alpha-methyl-styrene, from vinyl cyanide like acrylonitrile or methacrylonitrile, from acrylic and methacrylic acids or from their derivatives, principally acrylic and methacrylic acid esters.

The preferred additive polymers are the styrene-acrylonitrile copolymers, the polymers of the same type in which the styrene and/or acrylonitrile are replaced entirely or in part by the corresponding substituted monomers such as the methacrylonitrile-styrene copolymers, or the alphamethylstyrene-styrene-acrylonitrile terpolymers, as well as polyacrylates or polymethylmethacrylates, the copolymers of acrylate and/or methylmethacrylate-ethyl acrylate, the copolymers of methyl methacrylate-styrene and/or alpha methylystyrene, the polymers methyl methacrylate-styrene-acrylonitrile.

The molecular weight of the additive polymer, determined by the application of the STAUDINGER-MARK-HOUWINK equation: $[\eta] = KM^\alpha$, in which M represents the mean molecular weight, $[\eta]$ represents the intrinsic viscosity in a given solvent, K and $\alpha$ are specific parameters of the solvent polymer couple, must be above $10^6$.

In the compositions of the invention, there can be included, in case of need, the classic additives customarily used in thermoplastic polymers such as thermal stabilizers, lubricants, fillers, coloring agents, and the like in their usual amounts and for their usual purposes.

The compositions of the invention present the advantage of being able to be oriented at a higher temperature, about 15° to 20° C. higher, while having the same possibilities of elongation and giving the same characteristics for the finished objects as do the thermoplastic polymers alone. All this is provided while at the same time requiring lower tensile forces of 30% to 50%. The possibility of using less voluminous machines in regard to mechanics and less costly machines result therefrom.

In the current practice of the formulation and the transformation of polymers, the introduction of polymeric additives to classic polymers aims to modify the behavior at the time of fusion of said polymers in order to aid with their use by facilitating their mixing on their blending. This practice calls upon so-called gelification phenomena which, by modifying the interface of the resin grains, favors their flow and their interdiffusion and makes it possible to arrive at a better textural homogenization of the material used. These additives have a role of "processing aids" and their action favors the forming of the base polymer in temperature zones in which the material is in a superfused state located at about 100° to 140° C. above the glass transition temperature, i.e. for example, in the case of non-plasticized PVC, in the temperature zone of about 180° to 220° C.

It must be well understood that the present invention is well founded on the rheological properties of mixtures of thermoplastic polymers in the temperature zone corresponding to the viscoelastic state.

More precisely, the invention is based on the effect of additive polymers at very high molecular weights being introduced into classic polymers whose viscoelastic behavior is profoundly modified in the temperature range located just above the vitreous transition zone and over a temperature zone of some tens of degrees higher than the transition temperature.

The invention will be described in connection with the following examples which are set forth for purposes of illustration only.

EXAMPLE 1

This example shows modification of the viscoelastic behavior of PVC by the addition of a styrene-acrylonitrile having a high molecular weight.

By emulsion polymerization, a styrene-acrylonitrile (SAN) copolymer is prepared in 74/26 proportions, which after flocculation and drying has a viscosity in solution at 0.1% in dimethylformamide at 30° C., of 10.5 dl/g, corresponding to a molecular weight of about $6 \times 10^6$.

Tubes are then extruded on a WEBER DS 60 machine to form tubes having an external diameter of 63 mm and a thickness of 5 mm starting from two compositions, I and II, based on PVC.

|  | I | II |
| --- | --- | --- |
| PVC (EKAVYL SL 66) | 100 kg | 100 kg |
| Copolymer (SAN with a molecular weight of $6 \times 10^6$) | — | 5 |
| Calcium stearate | 1 | 1 |
| Paraffin wax | 1 | 1 |
| Stearic acid | 0.25 | 0.25 |
| Calcium carbonate | 2.5 | 2.5 |
| Titanium dioxide | 0.14 | 0.14 |
| Carbon black | 0.05 | 0.05 |

Test specimens of dumbbell form are cut out of these tubes, flattened in the hot state, then stretched until rupture at a speed of 666% per minute and at temperatures ranging from 95° to 160° C.

Figure 3:
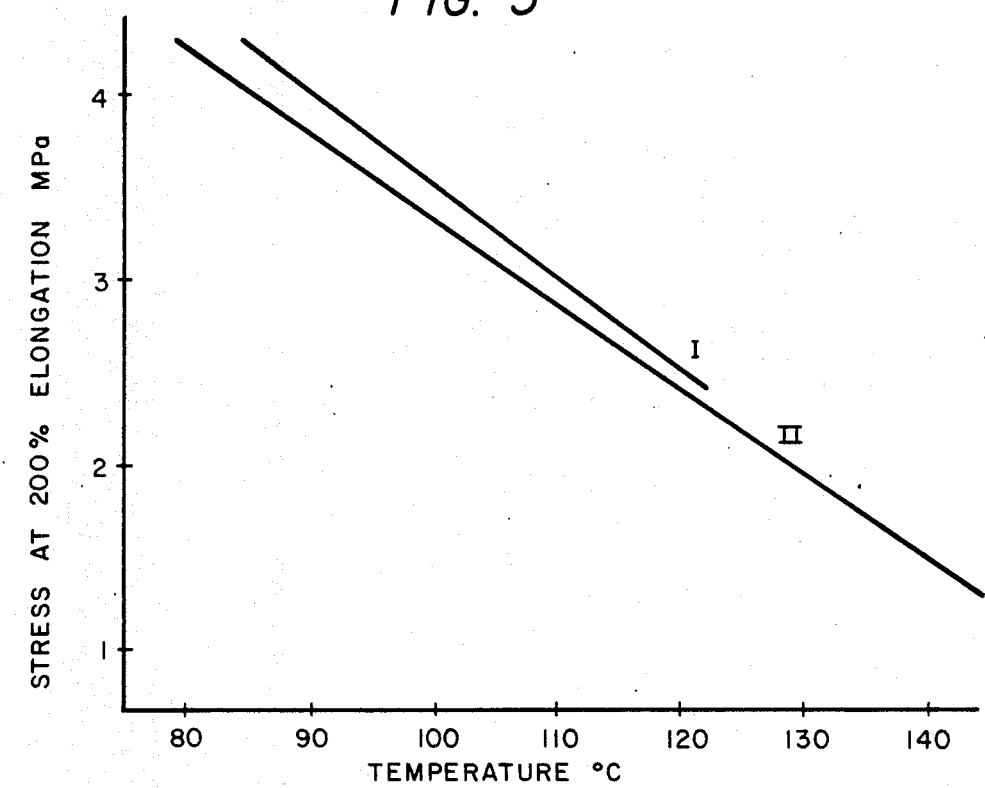

FIG. 3 is a graph representing, for the two compositions, the stress at 200% elongation as a function of the temperature.

It can be seen that the elongation force necessary is lower for composition II which includes 5% of the additive than it is for composition I without additive.

If it is desired to draw out the product at 200% by having the least force to apply, then it must be done at 123° C. for composition I and at 144° C. for composition II. The necessary stress with composition II amounts to 1.3 MPa as against 2.4 MPa with composition I, or 45% less for composition II.

If one draws out the test specimens at 200% at the speed of 666%/min. and if they are cooled again rapidly as soon as this elongation has been reached, then one obtains test specimens in which the macromolecules have been definitely oriented.

Figure 4:
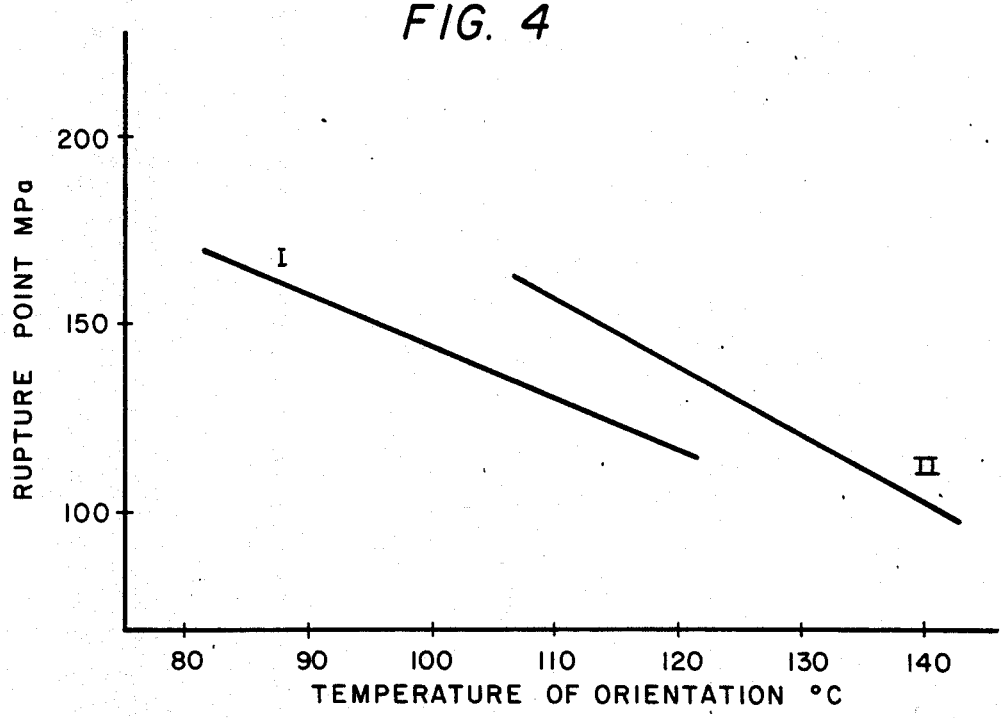

In order to characterize the improvement of rigidity obtained, one carries out a tensile test at 23° C. at a speed of 5 mm/min. on these oriented test specimens and notes the break point. FIG. 4 illustrates this break point as a function of the temperature at which the orientation has been carried out. It can be observed that composition II oriented at 130° C. presents nearly the same final break point as does composition I oriented at 115° C. According to the graph of FIG. 3, the stress to be exerted for the orientation amounts to 2.8 MPa for composition I and 1.9 MPa for composition II. The result of this is that the apparatus to be used for carrying out the orientation can be less powerful.

EXAMPLE 2

Comparative Example

This example shows the inefficiency of the addition of a styrene-acrylonitrile copolymer of low molecular weight in non-plasticized PVC.

By emulsion polymerization a styrene-acrylonitrile copolymer is prepared in 74/26 proportions, which, after flocculation and drying, exhibits a molecular weight of $2.5 \times 10^5$.

Subsequently, operating exactly according to Example 1, two compositions are prepared based on PVC; one of which contains 5 parts for a hundred of PVS of this styrene-acrylonitrile copolymer, and tubes are extruded.

On the test specimens cut out of these tubes, tensile strength measurements between 95° and 135° C. do not show any difference in behavior, except for the precision of the measurements, between the two compositions. The test specimens are then stretched 200% at the speed of 666%/minute in a temperature range going from 100° to 130° C. and suddenly cooled. On these oriented test specimens, the tensile strength at 23° C. and 5 mm/min. does not show any difference between the two compositions.

This styrene-acrylonitrile copolymer having a molecular weight of $2.5 \times 10^5$ does not change the viscoelastic behavior of the PVC because its molecular weight is not sufficient.

EXAMPLE 3

This example shows the modification of the viscoelastic behavior of an ABS copolymer by the addition of a styrene-acrylonitrile copolymer of high molecular weight.

To 100 parts by weight of ABS in powder form (UGIKRAL RA) is added 5 parts of the same styrene-acrylonitrile copolymer as used in Example 1, having a molecular weight of $6 \times 10^6$ of Example 1, and flat plates with a 1 mm thickness are extruded. Some test specimens are cut out of these plates (I) as well as out of the plates extruded using ABS only with no styrene-acrylonitrile added (II).

Figure 5:
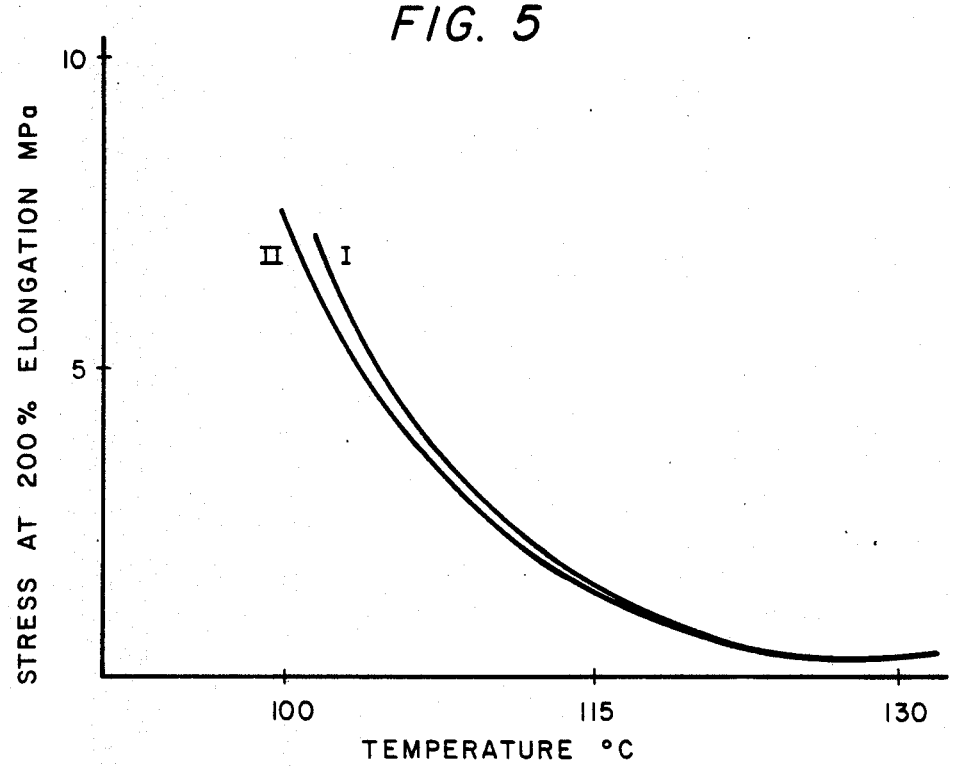

FIG. 5 is a graph showing the tensile stress at 200% of elongation at a speed of 666%/minute, as a function of the temperature. It can be observed that the addition of the additive polymer does not appreciably increase the stress and that the difference is annulled as soon as a temperature of 130° C. is reached.

Figure 6:
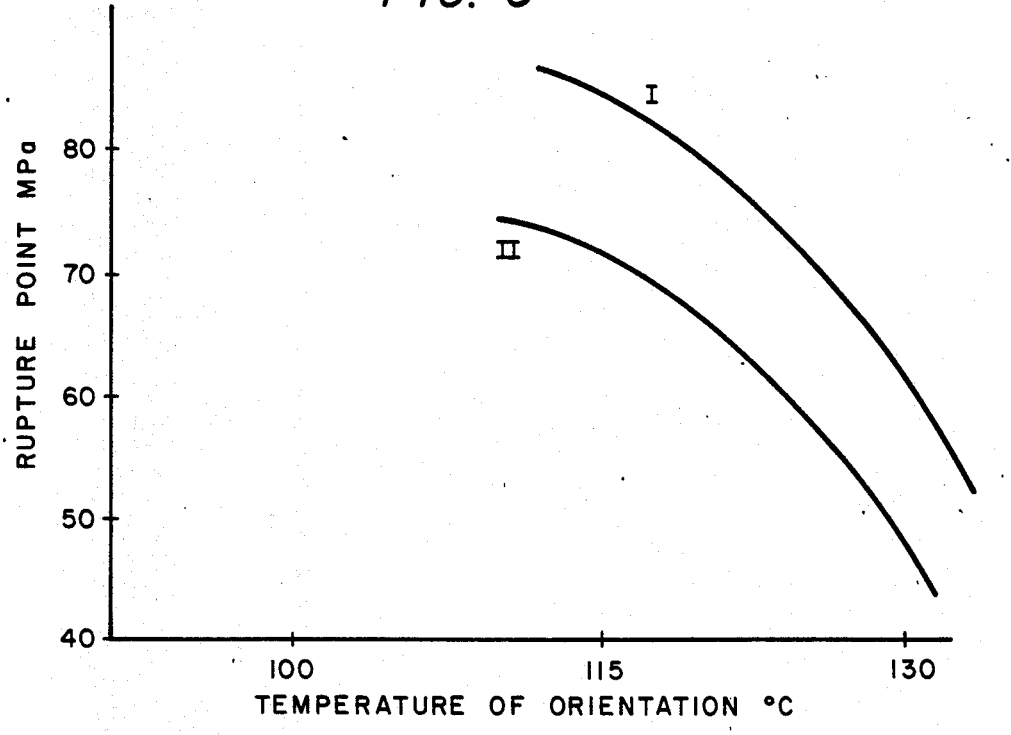

FIG. 6 is a graph showing the rupture load in traction at 23° C. and 5 mm/min. of test specimens having previously been drawn out from 200% to 666%/minute and suddenly cooled again. It can be observed that in order to obtain the same final stress at break when compared with an ABS alone oriented at a certain temperature one can use the composition of the invention by orienting at about 15° C. higher, which necessitates a lower stress by about 50% according to graph 5.

EXAMPLE 4

The modification of the viscoelastic behavior of the PVC by the addition of a copolymer of methyl methacrylate-ethyl acrylate at high molecular weight is illustrated in this example.

By emulsion polymerization, a copolymer (P-MMA/EA) of methyl methacrylate-ethyl acrylate in 95/5 proportions is prepared, which after flocculation and drying has a molecular weight of $2 \times 10^6$.

As in Example 1, tubes having a 63 mm diameter are extruded with two formulas based on unplasticized PVC, one of which contains 5 parts of this P-MMA/EA copolymer for each 100 parts by weight of PVC (I), with the PVC only tubes serving as a control (II). Test specimens of dumbbell form, cut out of the tubes and flattened in the hot state are drawn out at a speed of 666%/minute at temperatures ranging from 85° to 130° C.

Figure 7:
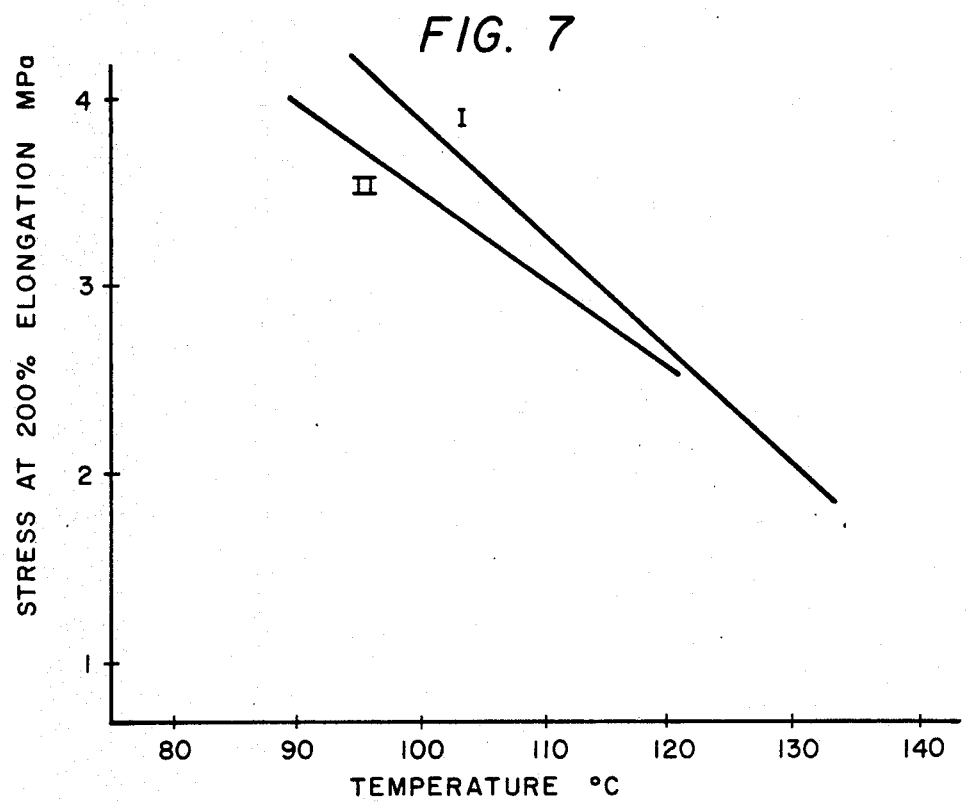

FIG. 7 is a graph showing for the two compositions the stress at 200% of elongation as a function of the temperature. It can be observed that the composition containing the P-MMA/EA additive yields a higher stress, but permits drawing by 200% at 132° C., while with pure PVC one cannot go beyond 123° C.

Figure 8:
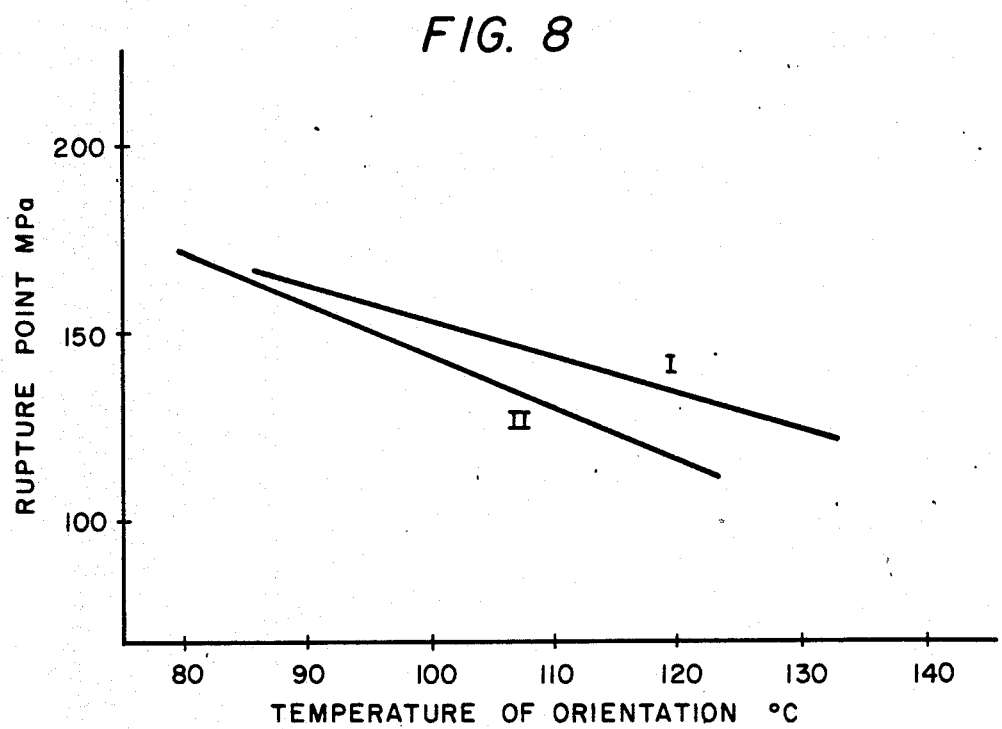

FIG. 8 is a graph showing the stress at break in traction at 23° C. and 5 mm/min. of test specimens oriented by elongation of 200%. It can be observed that one can obtain the same final resistance by orienting the composition containing the additive at higher temperature than for the pure composition. The difference varies from 5° to 15° C. and the stresses to be exerted on orientation can in the most favorable case be lower by 30%.

EXAMPLE 5

Comparative Example

Ineffectiveness of the addition of a copolymer of methyl methacrylate-ethyl acrylate of a low molecular weight to unplasticized PVC is shown in the example.

By emulsion polymerization, a copolymer of methyl methacrylate-ethyl acrylate is prepared in 95/5 proportions which after flocculation and drying shows a molecular weight of $1.5 \times 10^5$. Operating as in Example 4, test samples are made with a composition based on PVC alone and, on the other hand, from same composition to which 5 parts by weight, for a hundred of PVC, of this copolymer are added.

The behavior in traction in the hot state and the resistance to traction (tensile strength) at 23° C. and 5 mm/min. of test specimens having been previously elongated by 200% and cooled down again, show no significant difference between the two compositions. The molecular weight of the copolymer of methyl methacrylate-ethyl acrylate is too low for the viscoelastic behavior of the PVC to be modified in the range of temperatures 90°–140° C.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A process for biaxially orienting a non-foamed thermoplastic resin article comprising forming said article from an admixture of a thermoplastic resin selected from homopolymers and copolymers of vinyl chloride or acrylonitrile-butadiene-styrene copolymers capable of biaxial orientation and an additive resin having a molecular weight above $10^6$ and selected from copolymers of styrene-acrylonitrile, methacrylonitrile-styrene, alpha methylstyrene-styrene-acrylonitrile, methyl acrylate-ethyl acrylate, methyl methacrylate-ethyl acrylate, methyl methacrylate-styrene-alpha methylstyrene, methyl methacrylate-alpha methylstyrene, or methyl methacrylate-styrene-acrylonitrile, said admixture requiring a lower force to stretch during orientation than a thermoplastic resin article absent the additive resin, heating said article to a temperature of from about 5° to 20° C. above the glass transition temperature of said thermoplastic resin, and biaxially orienting said thermoplastic resin composition at said temperature.

2. The process of claim 1 wherein said article contains; for every 100 parts by weight of said thermoplastic resin, from about 0.2 to 5 parts by weight of said additive resin.

* * * * *